July 19, 1938.  K. C. BURROUGHS  2,124,343
APPARATUS FOR GRADING EMERY
Filed Jan. 3, 1935
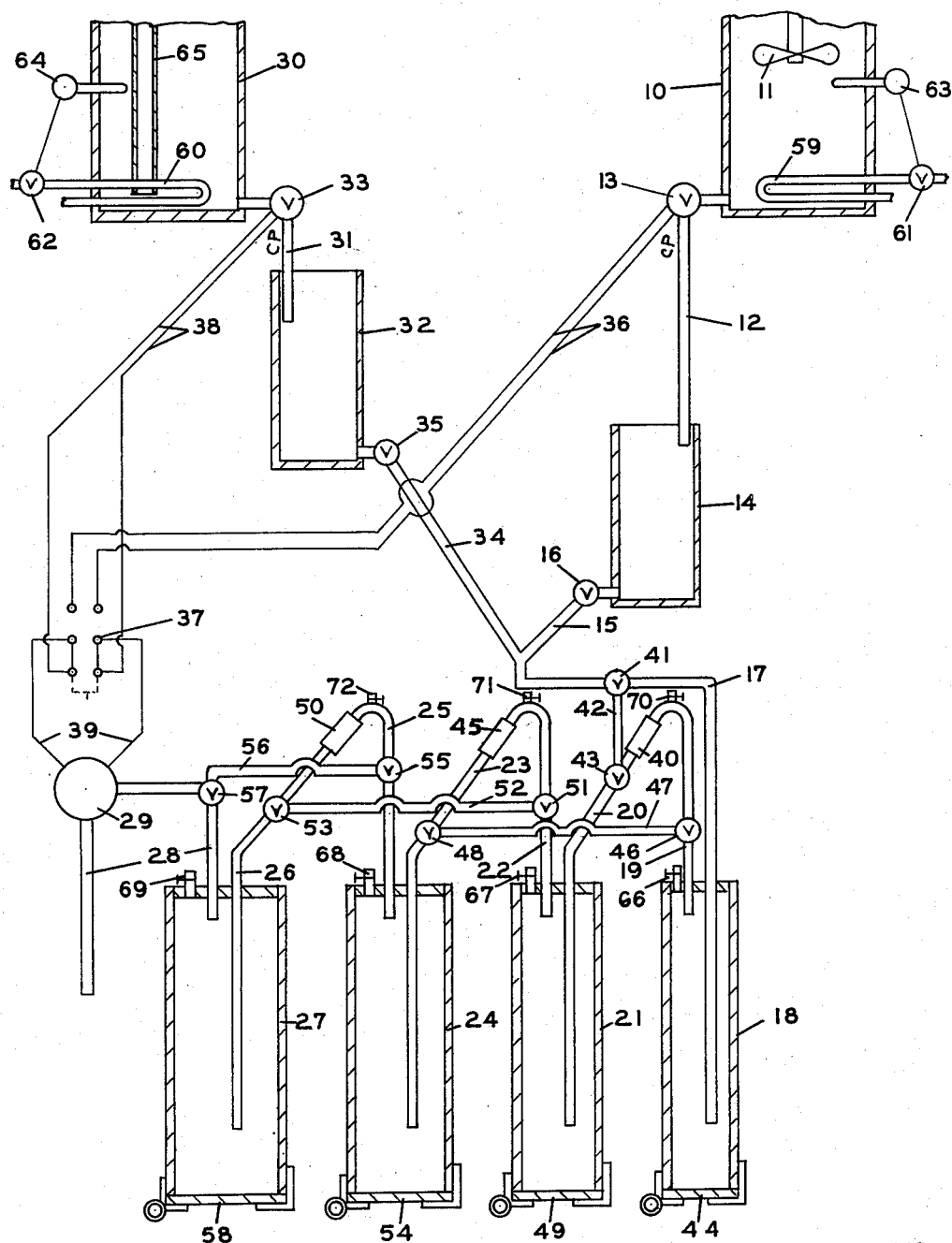
KENNETH C. BURROUGHS
INVENTOR Patented July 19, 1938

2,124,343

UNITED STATES PATENT OFFICE 2,124,343

APPARATUS FOR GRADING EMERY

Kenneth C. Burroughs, Rochester, N. Y., assignor to Bausch & Lomb Optical Company, Rochester, N. Y., a corporation of New York Application January 3, 1935, Serial No. 269

7 Claims. (Cl. 209—208)

The present invention relates to a method and apparatus for grading emery or the like and more particularly to a method and apparatus for grading emery or the like by elutriation and settling.

In the grinding of optical surfaces on lenses, mirrors or the like, it is essential that the abrasive be graded with the utmost accuracy. A single particle of abrasive, larger than the permissible size, will so scratch and mar the surface as to require complete regrinding.

One of the objects of the present invention is to provide a new and improved method and apparatus for grading emery or the like into grades suitable for grinding optical surfaces. Another object is to provide a new and improved method and apparatus for grading emery or the like by elutriation and settling. A further object is to provide a method and apparatus for grading emery or the like by elutriation and settling in which the flow of the fluid is maintained at a volumetrically constant rate. A further object is to provide a method and apparatus for grading emery or the like by elutriation and settling in which the entire system is maintained at room temperature and free from air bubbles. A still further object is to provide an apparatus for grading emery or the like in which settling tanks may be emptied without stopping the operation of the apparatus. A still further object is to provide a method and apparatus for grading emery or the like by elutriation and settling in which a measured amount of emery or the like is put into the system and clear water is used to complete the grading. A still further object is to provide a method and apparatus for grading emery or the like in settling tanks in which a constant vertically upward flow of water is maintained in each tank until the grading is complete. These and other objects and advantages reside in certain novel features of relations and combinations of parts and processes as will hereinafter be more fully set forth and pointed out in the appended claims.

In the drawing:

The figure shows a schematic diagram of an apparatus made according to this invention.

Referring to the drawing, 10 indicates a storage tank where emery or the like is maintained in suspension in water by a suitable agitating means such as the stirring paddle 11. An outlet pipe 12 from the storage tank 10 is controlled by a valve 13 and leads into a reservoir 14. A pipe 15, under the control of a valve 16, leads to a pipe 17 which terminates near the bottom of a settling tank 18. Near the top of the settling tank 18 is an outlet pipe 19 connecting with a pipe 20 which terminates near the bottom of a second settling tank 21. Similarly, a pipe 22 from near the top of the tank 21 connects to a pipe 23 terminating near the bottom of a third settling tank 24 and a pipe 25 from near the top of the tank 24 connects to a pipe 26 terminating near the bottom of a fourth tank 27. An outlet pipe 28 from near the top of the tank 27 passes the fluid out through a flow control mechanism 29 such as a fixed orifice and a pressure gage, the purpose of which will be described later.

The inlet pipes 17, 20, 23 and 26 do not extend all the way to the bottom of the respective tanks 18, 21, 24 and 27 but terminate some distance from the bottom. In this way there is a volume of still water at the bottom of the tank through which the emery settles. The larger pieces of emery tend to displace the smaller pieces so that the finer grades of emery are forced upwardly into the vertically moving current above the mouth of the inlet pipe. In this way, the grading of the emery is effected, not only by the falling of the emery particles against a moving stream of water, but also by the falling of the particles through still water, the two processes combining in effect to give a very accurate grading.

A second storage tank 30 holds clear water and its outlet pipe 31, which leads into a second reservoir 32, is under the control of a valve 33. An outlet pipe 34 from the reservoir 32 connects with the pipe 17 and is controlled by a valve 35.

The valve 13 is controlled through wires 36 which go to one side of a double throw switch 37 and the valve 33 is controlled through wires 38 which go to the other side of the double throw switch 37. The movable element of the switch 37 is connected to the flow control mechanism 29 through wires 39. In this way the rate of flow into the reservoirs 14 and 32 and hence the pressure head built up in those reservoirs is selectively regulated by the flow control mechanism on the outlet side of the settling tanks. Thus, the flow through the settling tanks can be maintained at a volumetrically constant rate, as a variation in the flow resistance of the settling tanks is compensated by a variation of the pressure head in the reservoir 14 or 32.

In operation the storage tank 10 is filled with water containing a definite amount of emery per unit volume and the storage tank 30 is filled with clear water. The valves 33 and 35 are closed, the valve 16 is opened and the switch 37 is closed so as to control the valve 13 from the flow control mechanism 29. After the apparatus has been running for a fixed time, which is the time required for enough emery to pass into the settling tanks to fill the tank 18 with its particular grade up near the open end of the pipe 17, the valves 13 and 16 are closed, the valve 35 is opened, and the switch 37 is closed so as to control the valve 33 from the flow control mechanism 29. The clean water from the tank 30 is passed through the settling tanks at the same volumetrically constant rate as the water carrying the emery to be graded. This clear water is flowed upwardly through the tank 18 until all of the emery, smaller than the grade to be retained in tank 18, is carried over into the settling tank 21.

In order to determine when all of the finer emery has passed over into settling tank 21, a glass tube 40 is placed between the pipes 19 and 20. As soon as this glass tube 40 shows that only clear water is passing into the settling tank 21, the valve 41 is turned to divert the clear water from the pipe 17 into a by pass pipe 42 which opens into the pipe 20 through a control valve 43. The water is let out of the settling tank 18 by a suitable means, not shown, and the emery is withdrawn from the tank 18 through a door 44. The tank 18 is then filled with clean water from an independent source, not shown, and the clean water from the reservoir is diverted back into the settling tank through the pipe 17 and clear water is run through the system until the glass tube 45, placed between the pipes 22 and 23, shows that only clear water is passing over into the settling tank 24. At that point the valve 46 is turned diverting the water from the pipe 19 through the by pass pipe 47 which is connected to the pipe 23 through a valve 48.

The valves 33 and 35 are then closed, the valve 16 is opened and the switch 37 is closed so as to control the valve 13 from the control device 29. It requires a considerable length of time for the emery and water to displace the clear water in the tank 18 and hence a considerable time will elapse before any emery will reach the mouth of the pipe 19. During that time, the water is let out of the settling tank 21 and the emery is removed through the door 49. Before any emery can reach the mouth of the pipe 19 the door 49 is closed, the tank 21 is filled with clear water from a source, not shown, and the water is diverted back into the pipes 19 and 20 and the settling tank 21. Again the water and emery are fed into the settling tank 18 for the predetermined time and then the clear water is flowed into the tank 18 as before.

The tanks 24 and 27 are emptied in the same way as the tank 21. A glass tube 50 between the pipes 25 and 26 shows when clear water is passing into the settling tank 27 while the overflow through the pipe 28 shows when all of the emery of a suitable size has been recovered. The tank 24 is cut out of the system by the valve 51 which passes the water through the bypass pipe 52 and the valve 53 into the tank 27. The emery is withdrawn through the door 54 and the tank 24 is filled with clear water from a source, not shown, during the time it takes the water and emery in the tank 21 to reach the mouth of the pipe 22. The valve 55 serves to divert the water from the pipe 25 to the bypass pipe 56 which connects to the overflow or outlet pipe 28 through a valve 57. The emery is withdrawn from the tank 27 through the door 58.

After the emery has been removed from a tank it is essential that the tank be filled with water before it is put back into the system. At no time during a run should any tank in the system be empty or partially empty as this would disrupt the control between the flow control device 29 and the reservoir and would also stop the flow of the fluid in the tanks following it in the series, thus permitting all of the emery in those tanks to settle. The entire system between the reservoir and the outlet is to be maintained completely full of water at all times during a run.

The flow through the settling tanks 18, 21, 24 and 27 is kept volumetrically constant by the flow control device 29. The most satisfactory control device for small flows such as those used in this system comprises a fixed orifice and a pressure actuated control mechanism located between the orifice and the valve 57. So long as the pressure at the fixed orifice remains constant, the flow through the orifice will be constant. The pressure actuated control mechanism regulates the pressure head in the reservoir 14 or 32 in order to maintain the pressure at the fixed outlet orifice constant. It is possible to use other flow control mechanism but the form outlined above is preferred. Each of the tanks is of uniform cross section and each is larger in cross sectional area than the tanks preceding it in the series. In this way, while the volumetric flow is constant throughout the system, the linear flow through each tank is slower than in the preceding tanks and hence the upward force of the water is less and smaller particles of emery can settle to the bottom of the tanks against the flow of the water. While only four tanks have been shown, obviously as many tanks will be used as one desires grades of emery. The cross sectional area of the settling tanks and the volumetric rate of flow depend on the sizes of the particles to be graded.

In order to prevent any eddy currents in the settling tanks due to temperature differences between the water and the air, the storage tanks 18 and 30 are provided with heating coils 59 and 60 respectively having respective valves 61 and 62 controlled by thermostats 63 and 64 respectively. Obviously other means could be employed to heat the water and the particular heating means shown forms no part of the present invention.

It is also essential that the system be kept free of air bubbles, if the emery is to be graded with an accuracy sufficient for use with optical surfaces. To prevent the introduction of such bubbles into the system, the water is introduced into the storage tank 30 through a pipe 65 which terminates near the bottom of the tank 30 at some distance from the mouth of the outlet pipe 31. In this way, the bubbles introduced from the original supply, are retained chiefly in the pipe 65 and kept out of the storage tank 30. The tanks 18, 21, 24 and 27 are provided at the top with outlet valves 66, 67, 68 and 69 respectively so that when the tank is filled with water after emptying, an escape is provided for the air. The pipes 19, 22 and 25 also have outlet valves 70, 71 and 72 respectively which permit the escape of any air which may be entrapped in them. It is permissible to leave a small amount of air in the tanks but the water must always rise above the ends of pipes 19, 22, 25 and 28 which project slightly into their respective tanks.

From the foregoing it will be apparent that I have provided a new and improved process and apparatus for grading emery or the like by elutriation and settling, with great accuracy and uniformity. While emery has been referred to as the substance to be graded, quite obviously my process and apparatus could be used to grade a wide variety of insoluble solids and oil or other fluids could obviously be used in place of the water. Various modifications can obviously be made without departing from the spirit of my invention or the scope of the appended claims.

I claim:

1. An apparatus of the class described comprising a plurality of settling tanks of uniform cross sectional area connected in series, each tank being of larger cross sectional area than the tank preceding it in the series, a reservoir, a second reservoir, selective means for passing fluid from either reservoir upwardly through each tank, means for maintaining the flow volumetrically constant throughout the system, means for maintaining the system at room temperature and means for preventing the formation of air bubbles in the system.

2. An apparatus of the class described comprising a plurality of settling tanks connected in series, means for feeding a fixed amount of emery in water suspension into said tanks, means for feeding clear water into said tanks to complete the elutriation of said emery, and means for establishing other series omitting any tank from said other series so that said tank may be emptied without interrupting the flow through the tanks in said other series.

3. An apparatus of the class described comprising a plurality of settling tanks connected in series, means for feeding a fixed amount of emery in water suspension into said tanks, means for feeding clear water into said tanks to complete the elutriation of said emery, and means establishing other series omitting any tank from said other series so that said tank may be emptied without interrupting the flow through the tanks in said other series, said last-named means including a pipe for by-passing the fluid around the tank to be emptied.

4. An apparatus of the class described comprising a plurality of settling tanks connected in series, means for feeding a fixed amount of emery in water suspension into said series, means for feeding clear water into said tanks to complete the elutriation of said emery, means for indicating when the elutriation is complete in each tank and means for establishing other series omitting any tank from said other series so that said tank may be emptied without interrupting the flow through the tanks in said other series.

5. An apparatus of the class described comprising a plurality of settling tanks connected in series, means for feeding a fixed amount of emery in water suspension into said series, means for feeding clear water into said tanks to complete the elutriation of said emery, means for indicating when the elutriation is complete in each tank, by-pass means for operatively removing any tank from the series for emptying without interrupting the flow through the remainder of the series, and means for maintaining the flow volumetrically constant throughout the series.

6. An apparatus of the class described comprising a plurality of settling tanks of uniform cross sectional area connected in series, each tank being larger than the one preceding it in the series, a reservoir containing emery suspended in a fluid, control means for varying the pressure head in said reservoir, a second reservoir containing fluid, control means for varying the pressure head in said second reservoir, means for selectively passing fluid from either reservoir upward through each tank, and means actuated by the flow through said series for selectively operating the control means of the reservoir in use to maintain the flow volumetrically constant throughout the series.

7. An apparatus for grading emery or the like comprising a plurality of closed tanks of different uniform cross sectional area, a plurality of pipes connecting said tanks in a closed series so that each tank is larger than the one preceding it in the series, said pipes each leading from the top of the smaller tank to the bottom of the larger tank, a reservoir for supplying an emery suspension to the smallest tank in the series, a source for supplying said suspension to said reservoir, means controlling said source for varying the pressure head in said reservoir, an overflow pipe leading from the largest tank in the series, and means actuated by the flow in said overflow pipe for regulating the varying means to maintain the flow volumetrically constant throughout the series.

KENNETH C. BURROUGHS.